United States Patent
Abatzoglou

(10) Patent No.: US 12,270,930 B1
(45) Date of Patent: Apr. 8, 2025

(54) METHODS AND SYSTEMS FOR PROCESSING RADAR SIGNALS

(71) Applicant: Deere & Company, Moline, IL (US)

(72) Inventor: Theagenis J. Abatzoglou, Dana Point, CA (US)

(73) Assignee: Spartan Radar, Inc., Los Alamitos, CA (US)

(*) Notice: Subject to any disclaimer, the term of this patent is extended or adjusted under 35 U.S.C. 154(b) by 198 days.

(21) Appl. No.: 17/862,783

(22) Filed: Jul. 12, 2022

(51) Int. Cl.
*G01S 13/89* (2006.01)
*G01S 7/02* (2006.01)

(52) U.S. Cl.
CPC .............. *G01S 7/023* (2013.01); *G01S 13/89* (2013.01)

(58) Field of Classification Search
CPC ................................. G01S 7/023; G01S 13/89
See application file for complete search history.

(56) References Cited

U.S. PATENT DOCUMENTS

| | | | | |
|---|---|---|---|---|
| 2021/0124011 A1* | 4/2021 | Madhow | ............... | G01S 13/878 |
| 2022/0065991 A1* | 3/2022 | Zhang | .................. | G01S 13/931 |
| 2022/0196798 A1* | 6/2022 | Chen | ...................... | G01S 13/89 |

* cited by examiner

*Primary Examiner* — Timothy A Brainard
*Assistant Examiner* — Ismaaeel A. Siddiquee
(74) *Attorney, Agent, or Firm* — Ion C. Moraru, Esq.; Nixon Peabody, LLP

(57) ABSTRACT

The present disclosure generally relates to methods, systems, apparatuses, and non-transitory computer readable media for processing radar signals of a MIMO radar system. By dynamically accounting for environmental noise both spatially and temporally, systems of the present disclosure can make radar-based systems more accurate and robust against noised-induced false detections, especially with respect to the use of sparse-receivers. More precisely, systems of the present disclosure may first process MIMO radar return data to identify one or more range-Doppler-elevation (RDE) bins exceeding a candidate detection criteria. Each identified candidate detection RDE bin may then be processed by a second search procedure to identify any azimuth bins (of the particular candidate detection RDE bin) exceeding a confirmed detection criteria. Each identified azimuth bin indicates a confirmed detection of a scatterer (e.g., an object) whose azimuth, elevation, range, and Doppler-velocity indicated by the identified azimuth bin and its associated candidate detection RDE bin.

19 Claims, 9 Drawing Sheets

US 12,270,930 B1

METHODS AND SYSTEMS FOR PROCESSING RADAR SIGNALS

TECHNICAL FIELD

The present disclosure generally relates to radar signal processing, and more particularly, methods, systems, apparatuses, and non-transitory computer readable media for processing radar signals of a MIMO radar system.

BACKGROUND

Radar is increasingly a key component of the sensor suites of many modern-day technologies. For many of these technologies, radar systems are used to image an environment or detect the position of objects within an environment. This is usually for a local environment—such as within several hundred meters—as opposed to the prior use of utilizing radar for more long-range tracking. Local object detection can be used for a variety of purposes, but may in particular be used to aid a system, such as a robot or self-driving car, in navigating through an environment. Radar has several advantages over other object detection systems in that it is unimpeded by inclement weather. However, the use of radar systems for (radar) imaging suffers from issues of noise and false detections, largely stemming from the large wavelength characteristic of radio waves and the typical low power of many radar systems. These issues, among other things, make it difficult to detect small objects or distinguish larger objects that are close to one another. While systems have been developed to partially overcome this difficulty, these enhanced radar systems typically either still have a lacking amount of resolution or have requirements that make their use prohibitively expensive.

As with all radar, a problem facing MIMO radar is the detection of false positives from noise. To avoid this, it is possible to remove noise based on a noise threshold. But a given noise threshold is not necessarily suitable at all times for a system. Thus, an adaptive algorithm like CFAR may be used to vary the rate. However, the noise may vary based on where in the scene a return is from, making a constant inappropriate.

While systems have been developed to partially overcome this difficulty, these enhanced radar systems typically either still have a lacking amount of resolution or have requirements that make their use prohibitively expensive. For example, using multiple antennas can be cheap, but still leaves lacking resolution. As another example, it is possible to design a MIMO system to have a desired resolution, but such a solution may require such a large amount of antennas that the system is cost prohibitive. Thus, better ways of enhancing the resolution of radar systems are greatly desired

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The present disclosure generally pertains to systems and methods for processing radar signals of a MIMO array, particularly to determine the relative position and motion of objects in an environment. These systems may be of use across a wide-range of applications utilizing radar systems for environmental imaging. By dynamically accounting for environmental noise both spatially and temporally, systems of the present disclosure can make radar-based systems more accurate while still being robust against noised-induced false detections. By the same process, embodiments of the present disclosure also make radar-based images more accurate and with greater fidelity, enhancing their use, particularly for environmental navigation.

More precisely, systems of the present disclosure may obtain radar return data from a MIMO array. This radar return data may then be processed by a first search procedure to identify any range-Doppler-elevation (RDE) bins exceeding a candidate detection criteria. Each identified candidate detection RDE bin may then be processed by a second search procedure to identify any azimuth bins (of the particular candidate detection RDE bin) exceeding a confirmed detection criteria. Each identified azimuth bin indicates a confirmed detection of a scatterer (e.g., an object) whose azimuth, elevation, range, and Doppler-velocity indicated by the identified azimuth bin and its associated candidate detection RDE bin.

Figure 1:
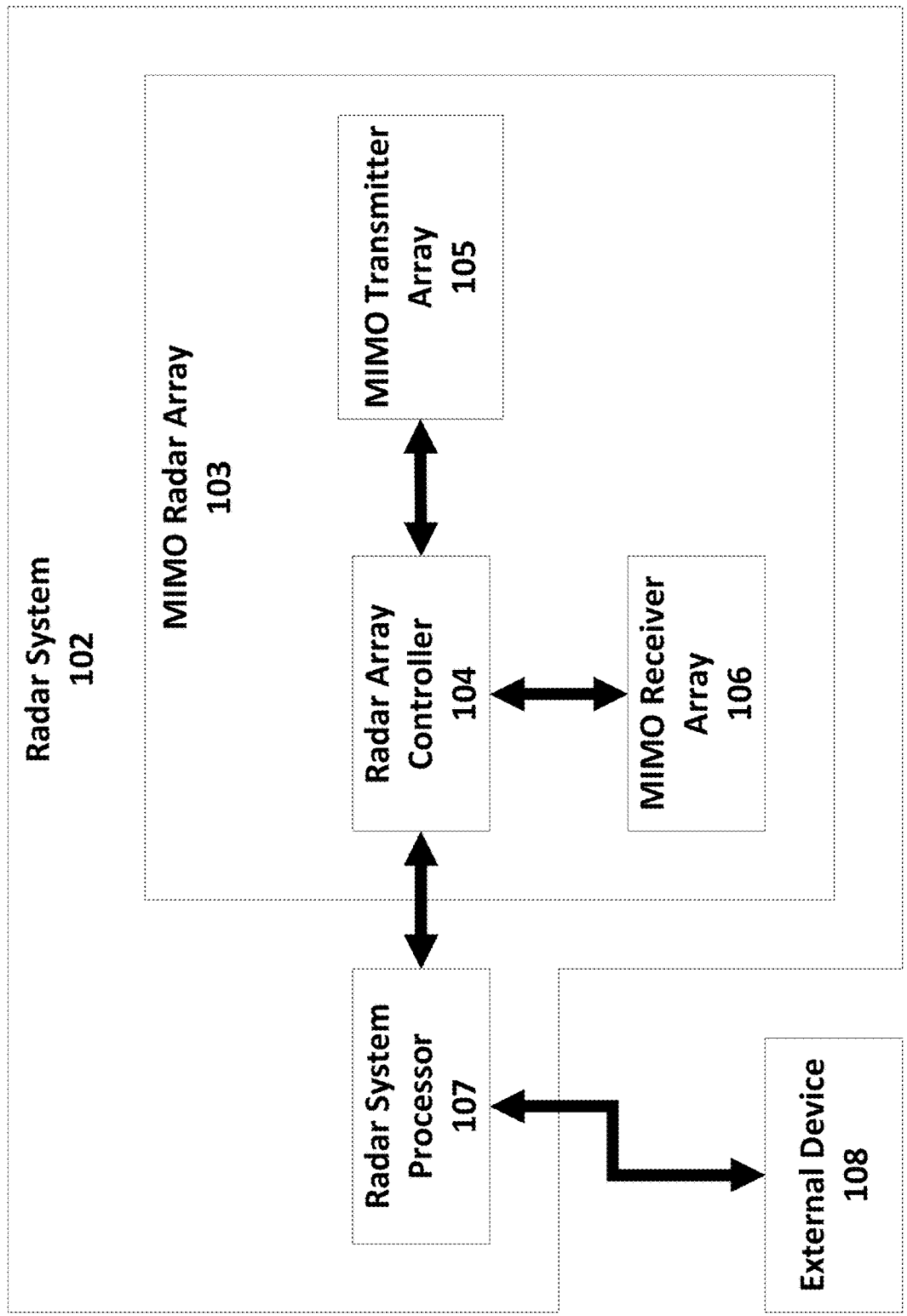
FIG. 1 is a block diagram of a multiple-input multiple-output (MIMO) radar system in accordance with an exemplary embodiment of the present disclosure.

FIG. 1 shows a block diagram of a radar system, in accordance with an exemplary embodiment of the present disclosure. As shown by the figure, a radar system 102 may comprise a multiple-input multiple-output (MIMO) radar array 103, at least one radar system processor 107. In turn, the MIMO radar array 103 may comprise a radar array controller 104, a transmitter array 105, and a receiver array 106. The radar system processor 107 is connected to and interacts with the MIMO radar array 103 and an external device 108. Similarly, the radar array controller 104 is connected to and interacts with the transmitter array 105 and the receiver array 106. Broadly speaking, the radar system processor 107 may work to control the MIMO radar array 103 and to process the radar return data (e.g., the radar return samples) obtained by the MIMO radar array 103, such as to implement the method described in FIG. 6 below. The MIMO radar array 103 may work to transmit radar signals and receive their reflections—as directed by the radar system processor 107—by interacting and controlling the transmitter array 105 and the receiver array 106.

In operation, the radar system processor 107 interacts with the MIMO Radar Array 103 to transmit and then receive a plurality of radar signals. The MIMO array controller 104—as directed by the radar system processor 107—then interacts with the transmitter array 105 to transmit a radar signal pulse (from each of the transmitter array's transmitter elements) and interacts with the receiver array 106 to obtain (from each of the receiver array's receiver elements) multiple sequential measurements of the radio waves being received. The radar array controller 104 may receive the measurements from the receiver array 106, where it may perform various initial low-level processing. This process is usually repeated for several iterations, such that multiple radar signal pulses are transmitted, each of which is associated with multiple samples measuring the radio wave being received by the receiver array 106. Eventually, the radar array controller 104 may send this data to the radar system processor 107, which may process the data for various higher-level signal processing (e.g., radar imaging and object detection), such as the method described in FIG. 5 below. The result of this processing may then be transmitted to an external device 108 for various purposes.

The radar system processor 107 may be implemented in hardware or a combination of hardware and software. As an example, the radar system processor 107 may comprise one or more field programmable gate arrays (FPGAs) or one or more application-specific integrated circuits (ASICs). In some embodiments, the radar system processor 107 may comprise one or more processors (e.g., central processing units (CPUs) or microprocessors) programmed with software that when executed by the processor cause it to perform the functions described herein for the radar system processor 107. In other embodiments, other configurations of the radar system processor 107 are possible.

Similarly, the radar array controller 104 may be implemented in hardware or a combination of hardware and software. As an example, the radar array controller 104 may comprise one or more field programmable gate arrays (FPGAs) or one or more application-specific integrated circuits (ASICs). In some embodiments, the radar array controller 104 may comprise one or more processors (e.g., central processing units (CPUs) or microprocessors) programmed with software that when executed by the processor cause it to perform the functions described herein for the radar array controller 104. In other embodiments, other configurations of the radar array controller 104.

Note that, while shown separately in FIG. 1, the radar system processor 107 and the radar array controller 104 may be combined into one component or otherwise share hardware resources, such as memory or processors. When separated, like in FIG. 1, the radar array controller 104 typically controls low-level functioning and management of the transmitter array 105 and the receiver array 106, along with other possible components of the MIMO radar array 103, such as a power source. In contrast, the radar system processor 107 typically handles higher-level functioning of the radar system 102 and typically handles processing radar return samples to perform various radar imaging functions. Also note that in some embodiments, unlike what is shown in FIG. 1, the radar system processor 107 may not connect to an external device.

Figure 2:
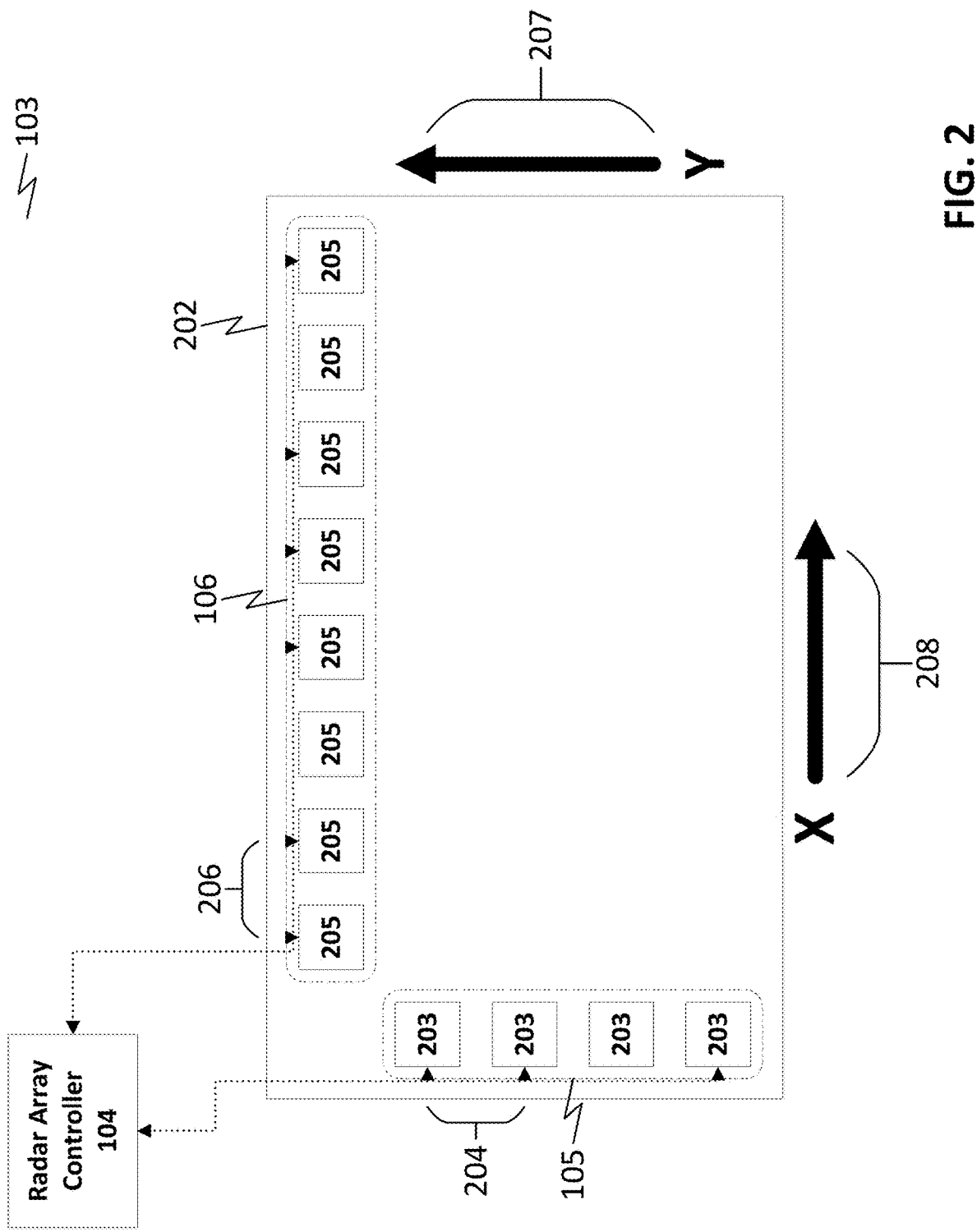
FIG. 2 is a block diagram of a MIMO radar array, such as the MIMO radar array of FIG. 1.

FIG. 2 shows a more detailed diagram of the MIMO radar array shown in FIG. 1. As shown by the figure, the MIMO radar array 103 comprises the radar array controller 104, the transmitter array 105, and the receiver array 106. The transmitter array 105 comprises a plurality of transmitter elements 203. Similarly, the receiver array 106 comprises a plurality of receiver elements 205. The transmitter elements 203 and the receiver elements 205 are arranged together to form a MIMO antenna array 202, with the transmitter elements 304 arranged along a first axis (shown here as y-axis 207) and the receiver elements 205 arranged along an orthogonal second axis (shown here as x-axis 208). Like with all full planar MIMO antenna arrays, the transmitter elements 203 of MIMO antenna array 202 are distributed along an axis (e.g., y-axis 207) with a uniform spacing distance, shown here as y-axis spacing distance 204. Similarly, the receiver elements 205 of MIMO antenna array 202 are distributed along another axis (e.g., x-axis 208) orthogonal to the first axis with a uniform or sparse spacing distance, shown here as x-axis spacing distance 206.

Figure 3:
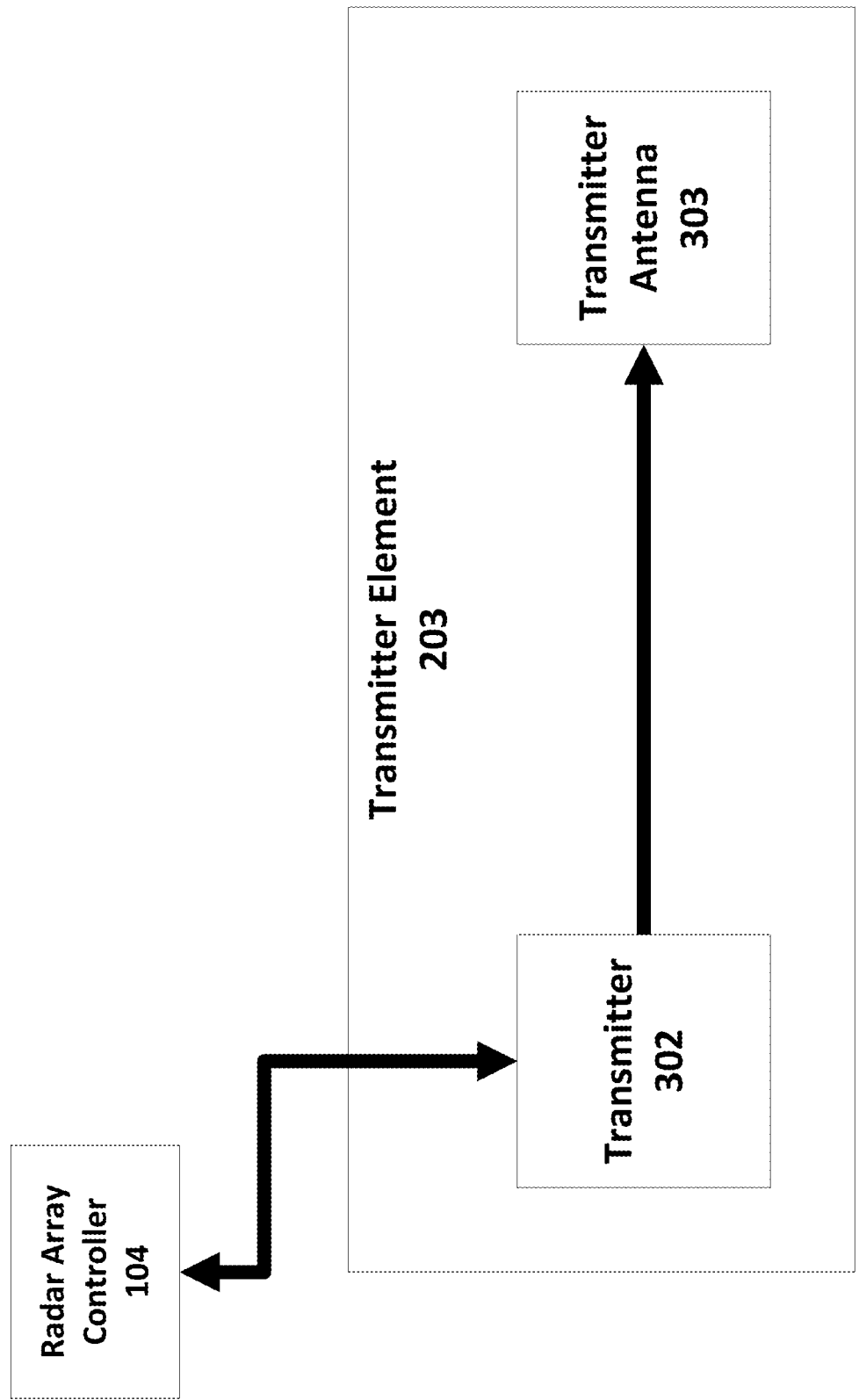
FIG. 3 is a block diagram of a transmitter element of a MIMO radar array, such as the MIMO radar array of FIG. 2.

FIG. 3 shows a diagram of the transmitter element shown in FIG. 2. As shown by the figure, a transmitter element 203 may comprise a computer-controlled transmitter 302 and a transmitter antenna 303. The transmitter 302 is connected to the transmitter antenna 303 and the radar array controller 104. In operation, the radar array controller 104 sends a command to the transmitter element 203 to transmit a radio signal with a specified frequency, amplitude, and phase. The transmitter 302 receives this command and, in response, generates an electrical signal with a frequency, amplitude, and phase corresponding to frequency, amplitude, and phase specified in the received command. The transmitter antenna 303 then receives the electrical signal from the transmitter 302 and emits a corresponding radio wave signal whose frequency, amplitude, and phase are as specified in the command from the radar array controller 104.

Figure 4:
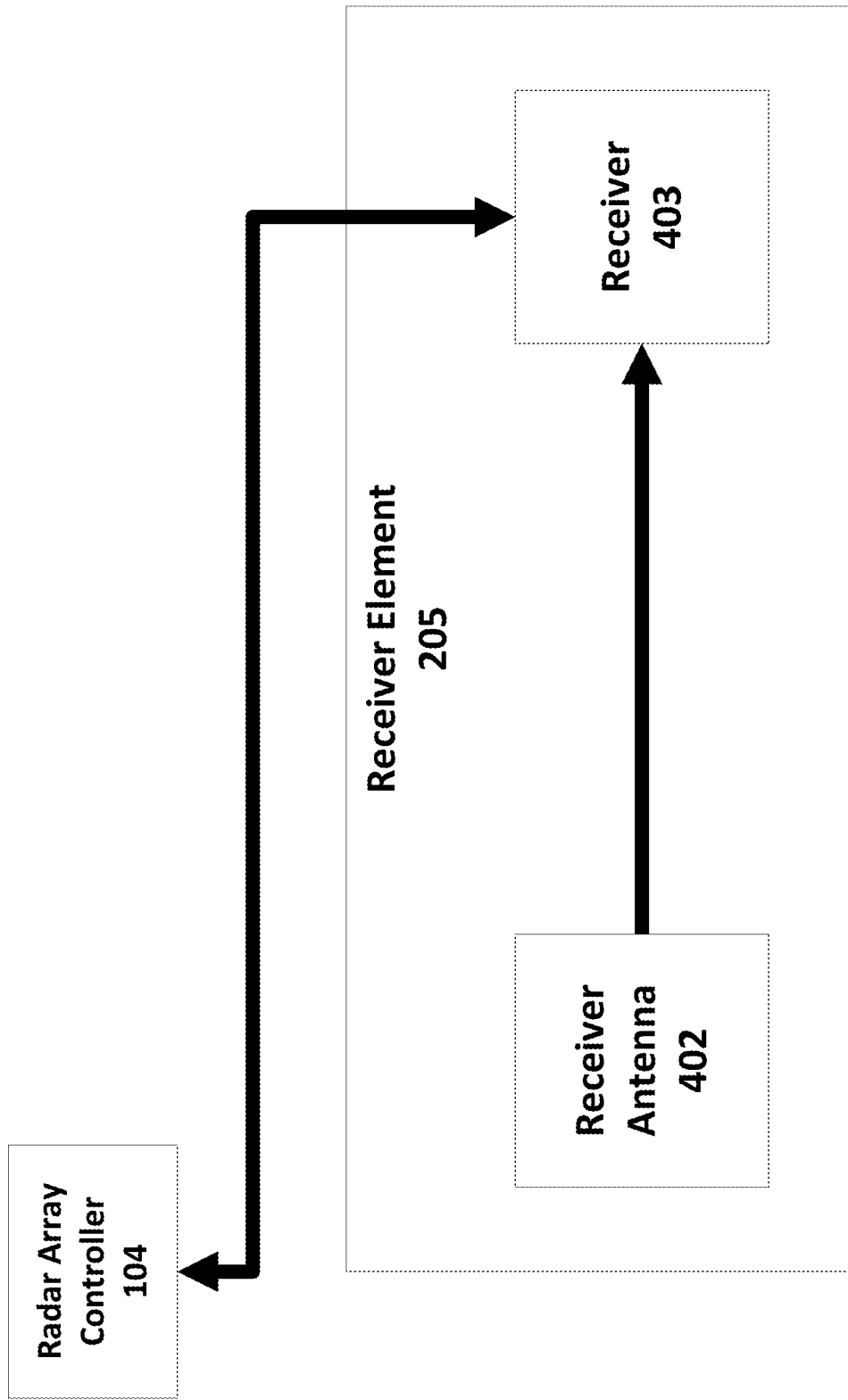
FIG. 4 is a block diagram of a receiver element of a MIMO radar array, such as the MIMO radar array of FIG. 2.

FIG. 4 shows a diagram of the receiver element shown in FIG. 2. As shown by the figure, a receiver element 205 may comprise a receiver antenna 402 and a computer-controlled receiver 403. The receiver 403 is connected to the receiver antenna 402 and the radar array controller 104. In operation, the radar array controller 104 sends a command to the receiver element 205 to measure the frequency and amplitude of the radio waves being received after first modifying the phase of the received radio waves by a certain phase shift. The receiver 403 receives this command and, in response, receives an electrical signal being generated by the receiver antenna 402. This electrical signal is generated by the receiver antenna 402 in response to receiving a radio wave signal that has a certain frequency, amplitude, and phase, with the generated electrical signal's frequency, amplitude, and phase corresponding to the frequency, amplitude, and phase of the received radio wave signal. After it receives the electrical signal from the receiver antenna 402, the receiver 403 modifies the phase of the electrical signal according to the command from the radar array controller 104 and the measures the modified electrical signal's frequency and amplitude.

To better explain, note that radar systems operate, at a fundamental level, by transmitting a radar signal and then attempting to receive echoes of the transmitted radar signal caused by the transmitted radar signal encountering and reflecting off various objects in the environment. These received echoes can then be processed to determine various information about the object that caused them, with the possible information able to be gathered depending on the specifics of the given radar system. As a result of the fundamental operation just described, one of the key factors affecting the performance of a radar system is its ability to detect echoes of its transmitted radar signal.

In turn, one of the key factors affecting a radar system's ability to detect echoes of its transmitted radar signal is environmental noise. The reason that environmental noise significantly affects the ability of a radar system to detect echoes of its transmitted radar signal is due to the manner in which radar systems detect these echoes. In short, to detect an echo, a radar system may use a radio receiver (or possible multiple receivers) to evaluate the radar signal being received at a location (typically the receiver's antenna). In general, however, a received radar signal is a combination of radio sub-signals from various sources (i.e., a received radar wave is a combination of radar waves from various sources). When present, an echo that has been reflected back to the receiver is one of these contributing radio sub-signals (and the reflecting object is one of the various sources).

As a consequence, for a radar system to determine whether it has received an echo of the transmitted radar signal (i.e., to detect an echo), some method of identifying when a received radio signal is comprised of a (potential) echo of the transmitted radar signal is needed (e.g., so that the potential echo can be evaluated to determine if it is a true echo). In general, these methods all generally utilize multiple measurements of the received radar signal over a (typically) short period of time to achieve this result. Ultimately, however, for all these methods, the more radar sub-signals included in a received radar signal, and the greater the contribution of these radar sub-signals to the overall received radar signal relative to any radar sub-signals of interest), the more difficult it is to accurately separate and or identify a echo in the received radar signal.

A problem being solved is that radar arrays face issues of noise. This noise, because of its additive nature, results in false positives—detections of objects that are not actually present. A simple approach to mitigate the issue of noise is to set a threshold below which a signal will be disregarded. Set appropriately, this can allow a majority of true scatterers to be detected and prevent a majority of would-be false detections.

For MIMO systems, however, a static noise threshold is less than ideal. The causes of noise are many and varied, but they generally correspond to a particular environment. Different environments will present different noise levels, changing what noise threshold is best to prevent a desired portion of would-be false detections. Naturally, environments with higher noise levels generally require a higher detection threshold and those with lower noise levels generally require a lower detection threshold. A static threshold, given its unchanging nature, cannot account for these different noise levels. Thus, to ensure a given false alarm rate (i.e., to ensure that the likelihood of a false detection is no greater than a certain probability), the static threshold must generally be set at a level that accounts for the more noisy environments, rendering it inefficient for less noisy environments.

A more advanced approach seeks to partially mitigate this issue by allowing the detection threshold to vary—to change depending on the environment and its background noise levels. By, from time to time, evaluating the environment to estimate its noise level, this approach allows the detection threshold to be adjusted so as to optimize (e.g., minimize) the probability for false negatives (i.e., true returns that are ignored) while not exceeding an acceptable probability for false positives (i.e., noise that is treated as a return). In other words, it works by setting the noise threshold (nearly) as low as it can be—and thereby reducing the chance of a true return being excluded—while still having it high enough that the probability of noise being "detected"—is kept at (or below) a desired level.

While this is an improvement over the simplest approach, it still may be less than ideal for MIMO radar systems. The noise estimations using these existing approaches are done on the basis of an environment at a given time. In other words, the noise of the entire environment is lumped together and assessed. However, the noise of an environment is not spatially homogenous. Noise varies based on what direction from which a potential return originates. Take, for example, a MIMO radar system in an environment with a large number of objects to its left and a large open area to its right. In general, the noise from the left-side environment will be significantly higher than the noise from the right-side of the environment. In this example the noise anisotropy is from secondary echoes from the objects.

Thus, the optimal noise threshold to use for evaluating a given return signal varies not just on the environment, but on the direction from which the return signal originates within the environment. Thus, to the extent spatial localization is possible for a radar system, failing to take into account where a return originates—and the noise level of this region—results in less accuracy than could otherwise be achieved. MIMO radar systems, given their nature, are capable localizing, to a degree, the spatial area from which a signal originates. Thus, existing methods fail to fully utilize the capabilities of MIMO radar systems.

To better address these issues, embodiments of the present disclosure may process radar signals using an approach that takes into account the spatial distribution of noise in an environment. Specifically, embodiments of the present disclosure may first process radar return data (e.g., a plurality of radar return samples) to detect one or more Range-Doppler-elevation (RDE) bins exceeding a candidate detection criteria. The radar return data corresponding to the identified candidate detection RDE bins may then be processed to detect one or more azimuth bins exceeding a confirmed detection criteria. As described in more detail below, because the confirmed detection criteria is calculated for each detected candidate detection RDE bin, the confirmed detection criteria is adapted to the noise level at the particular range, distance, and elevation for that RDE bin.

Figure 5:
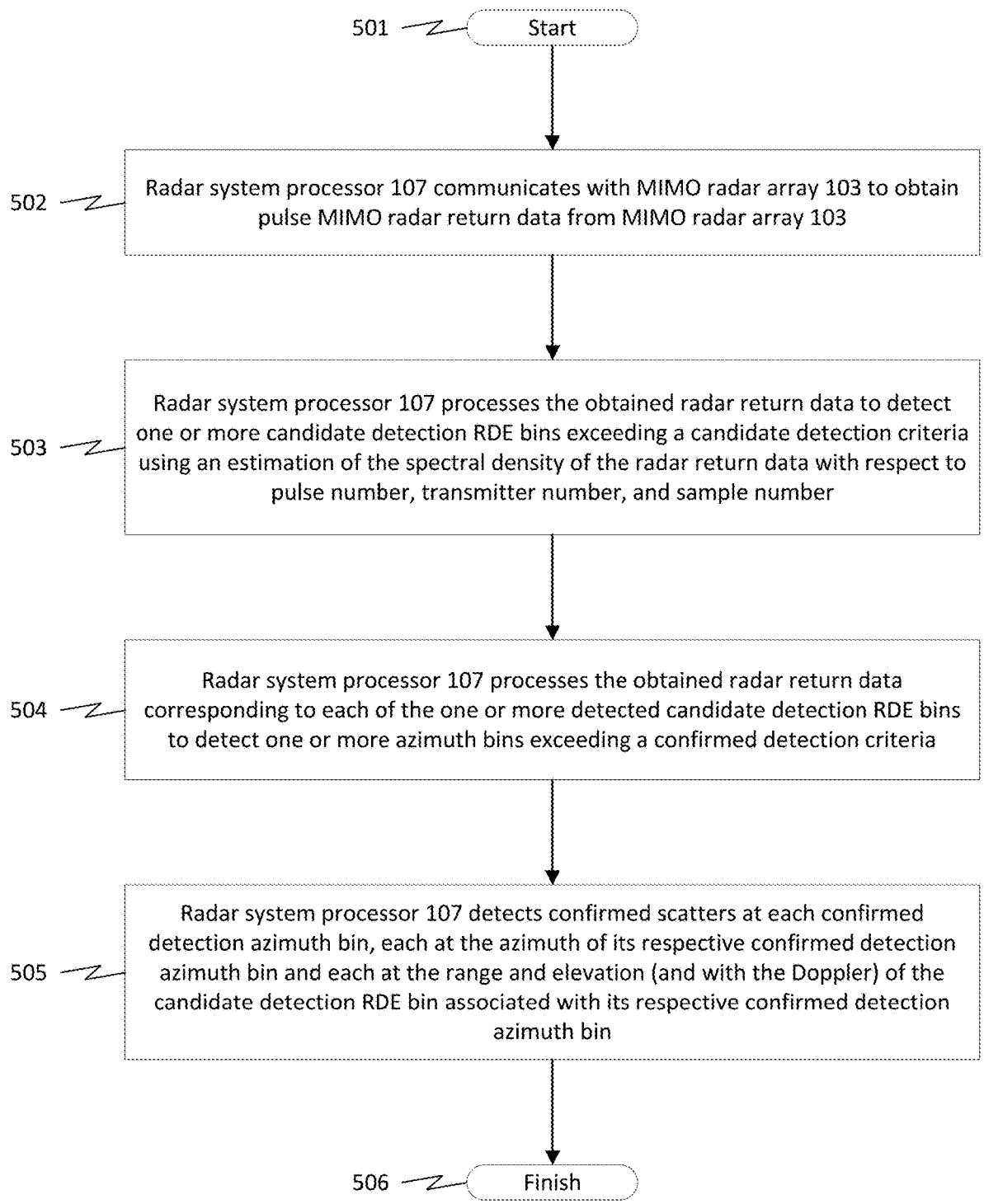
FIG. 5 is a flowchart of an exemplary method of processing radar signals, such as the ones created and measured by the MIMO radar array of FIG. 2.

FIG. 5 is a flowchart illustrating a process of processing radar signals as just described. To start, as shown by block 502 of FIG. 5, the radar system processor 107 communicates with the MIMO radar array 103 to obtain pulse MIMO radar return data. More precisely, the radar system processor 107 communicates with the radar array controller 104 to have a series of radar signal pulses (collectively a pulse train) transmitted and to have a series of radar return measurements taken for each transmitted radar signal pulse. Thus, for each radar pulse—identified sequentially by a pulse number—there are several radar return samples—similarly identified sequentially by a sample number.

Moreover, because the MIMO radar array 103 is a MIMO radar array, each radar pulse is comprised of sub-pulses sent by each transmitter element 203 of the MIMO transmitter array 105. Similarly, each radar return sample is comprised of sub-samples taken by each receiver element 205 of the MIMO receiver array 106. Thus, for each radar pulse there are a number of radar sub-pulses, which are identified by the transmitter number of the associated transmitter element 203. Likewise, for each radar return sample there are a number of radar return sub-samples, which are identified by the receiver number of the associated receiver element 205.

Collectively, the radar return data obtained by the MIMO radar array 103 comprises a four-dimensional (4D) data cube of radar return sub-samples indexed by 4 parameters: pulse number, transmitter number, sample number, and receiver number. Pulse number identifies a particular associated radar signal pulse from the overall pulse train. Transmitter number identifies a particular radar signal sub-pulse (by the identity of the transmitting transmitter element 203) associated with a particular radar signal pulse. Sample number identifies a particular radar return sample associated with a particular radar signal sub-pulse. Receiver number identifies a particular radar return sub-sample (by the identity of the receiving receiver element 205) associated with a particular radar return sample.

Figure 9:
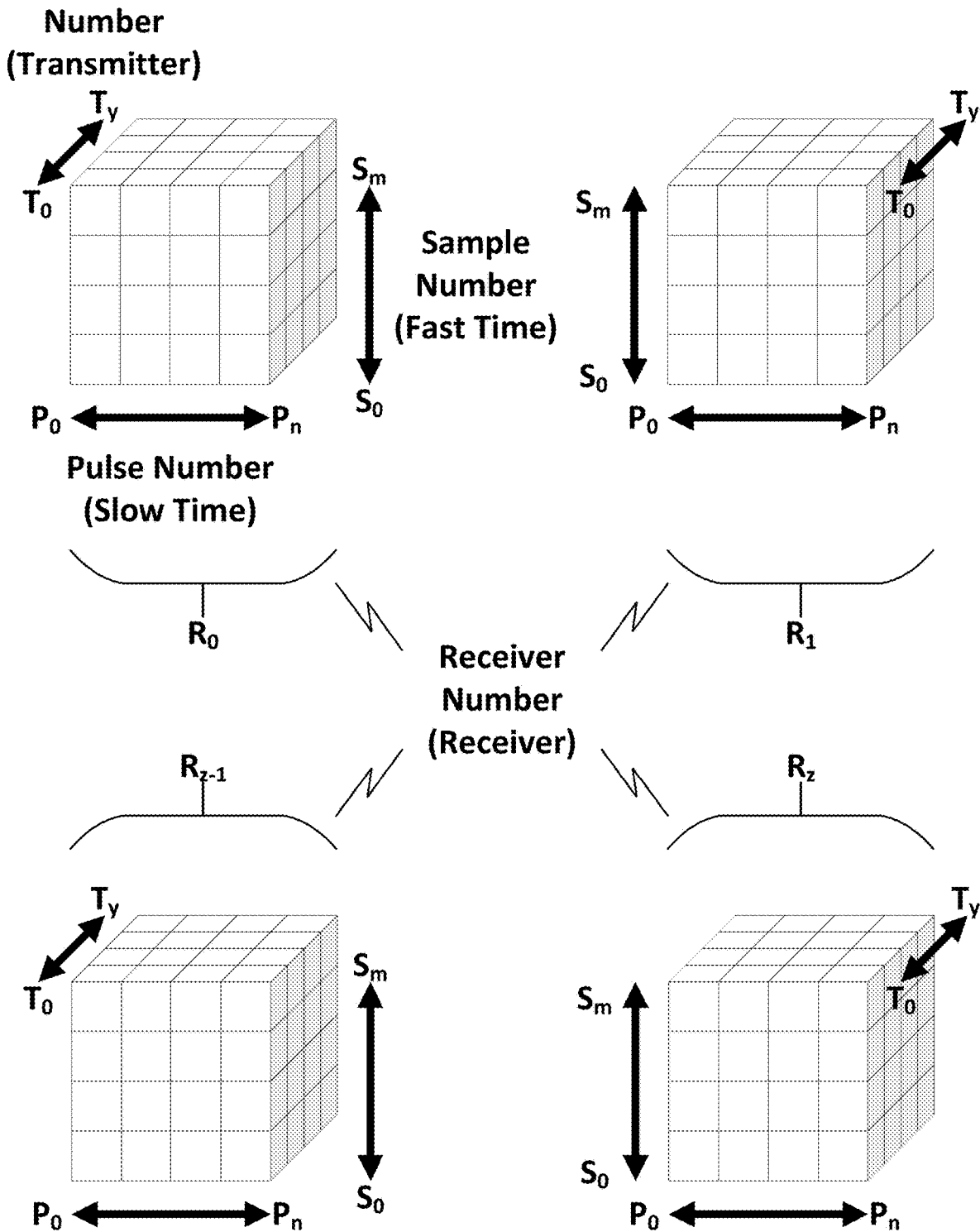
FIG. 9 is an illustration showing radar return data as a 4-dimensional (4D) data cube of radar return samples in accordance with an exemplary embodiment of the present disclosure.

FIG. 9 shows an illustration of a 4D data cube like the one just described. In particular, the figure shows several three-dimensional (3D) data cubes—which, collectively, comprise a 4D data cube, with each such 3D data cube corresponding to a receiver number $R_0$ to $R_z$. Each data cube has several radar return samples, with each radar return sample being indexed by pulse number $P_0$ to $P_n$, transmitter number $T_0$ to $T_y$, and sample number $S_0$ to $S_m$.

After the radar system processor 107 obtains the radar return data, the radar system processor 107 processes the radar return data to detect one or more candidate range-Doppler-elevation (RDE) bins. More precisely, as shown by block 503 of FIG. 5, the radar system processor 107 may process the radar return data using a spectral density estimation technique (e.g., the Fourier transform) to determine the (discrete) spectral density (i.e., the intensity of a received signal as a function of frequency) of the radar return data with respect to pulse number, transmitter number, and sample number. Each discrete frequency bin of the estimated spectral density (representing a three-dimensional frequency) corresponds to an RDE bin. The radar system processor 107 may then process the RDE bins to identify the RDE bins that are local maxima (i.e., the RDE bins whose associated frequency intensity is not less than the frequency intensity of any immediately neighboring RDE bins).

Additionally, after estimating the spectral density of the radar return data to determine the RDE bins, the radar system processor 107 may use the RDE bins (e.g., the intensity value (of the frequency) associated with each RDE bin) to calculate a candidate detection criteria. As discussed in more detail below, the candidate detection criteria is a first-pass assessment of the intensity needed, given the noise present, for it to be possible to distinguish a local maximum RDE bin (LM-RDE bin) caused by an echo of one of the transmitted radar (sub-)signals reflecting of a scatterer from an LM-RDE bin caused by noise. The candidate detection criteria is usually calculated using a relatively fast measure of the noise associated with the RDE bins (e.g., the median noise power associated with them). After calculating the candidate detection criteria, the radar system processor 107 may evaluate each LM-RDE bin against the candidate detection criteria. The LM-RDE bins that satisfy the candidate detection criteria may indicate (but do not necessarily indicate) the presence of a scatterer. Accordingly, LM-RDE bins that meet the candidate detection criteria are called candidate detection RDE bins.

After detecting the one or more candidate detection RDE bins, the radar system processor 107 processes each candidate detection RDE bin to detect one or more confirmed detection azimuth bins. More precisely, as shown by block 504 of FIG. 5, the radar system processor 107 may, for each candidate detection RDE bin, process the candidate detection RDE bin's associated radar return data using a spectral density estimation technique (e.g., the iterative adaptive approach (IAA) or the related missing-data iterative adaptive approach (MIAA)) to determine the (discrete) spectral density of the candidate detection RDE bin's associated radar return data with respect to receiver number (i.e., to determine the azimuth spectral density for that RDE bin). Each discrete frequency bin of a candidate detection RDE bin's estimated spectral density corresponds to an azimuth bin associated with the candidate detection RDE bin. The radar system processor 107 may then process the RDE bin's associated azimuth bins to identify the azimuth bins that are local maxima (i.e., the azimuth bins whose associated frequency intensity is not less than the frequency intensity of any immediately neighboring azimuth bins).

Computing the azimuth bins separately for each of the candidate detection RDE bins may be useful in enabling efficient use of MIMO receiver arrays that are sparsely populated with receivers (i.e., sparse MIMO receiver arrays). This may be particularly true for MIMO receiver arrays whose receiver spacing is equal to (roughly) one-half wavelength of the signal being received.

Additionally, after estimating the spectral density of the candidate detection RDE bin's associated radar return data to determine the candidate detection RDE bin's associated azimuth bins, the radar system processor 107 may use the associated azimuth bins (e.g., the intensity value (of the frequency) associated with each azimuth bin) to calculate a confirmed detection criteria. As discussed in more detail below, the confirmed detection criteria is an assessment of whether a local maximum azimuth bin (LM-azimuth bin) is, with some desired degree of reliability, caused by an echo of one of the transmitted radar (sub-)signals reflecting of a scatterer as opposed to noise. The confirmed detection criteria is usually calculated using a relatively slower, more sophisticated measure of the noise associated with the azimuth bins than used by the candidate detection criteria.

After calculating the confirmed detection criteria, the radar system processor 107 may evaluate each LM-azimuth bin against the confirmed detection criteria. The LM-azimuth bins that satisfy the confirmed detection criteria indicate the confirmed (e.g., with less than some desired probability of a false positive) presence of a scatterer. Accordingly, LM-azimuth bins that meet the confirmed detection criteria are called confirmed detection azimuth bins.

After processing each candidate detection RDE bin and detecting any of the candidate detection RDE bins' confirmed detection azimuth bins, the radar system processor 107 may determine the parameters of any scatterers that have been detected. Specifically, as shown by block 505 of FIG. 5, the radar system processor 107 may confirm, for each confirmed detection azimuth bin, a scatterer with the azimuth, range, Doppler-velocity, and elevation indicted by the corresponding confirmed detection azimuth bin and confirmed detection azimuth bin's associated candidate detection RDE bin. In other words, each confirmed detection azimuth bin indicates the presence of a scatterer. A scatterer indicated by a confirmed detection azimuth bin is located at the azimuth associated with (the frequency) of the confirmed detection azimuth bin and at the elevation and range associated with (the frequency) of the confirmed detection azimuth bin's associated candidate detection RDE bin (also with the Doppler-velocity associated with (the frequency) of the confirmed detection azimuth bin's associated candidate detection RDE bin).

Figure 6:
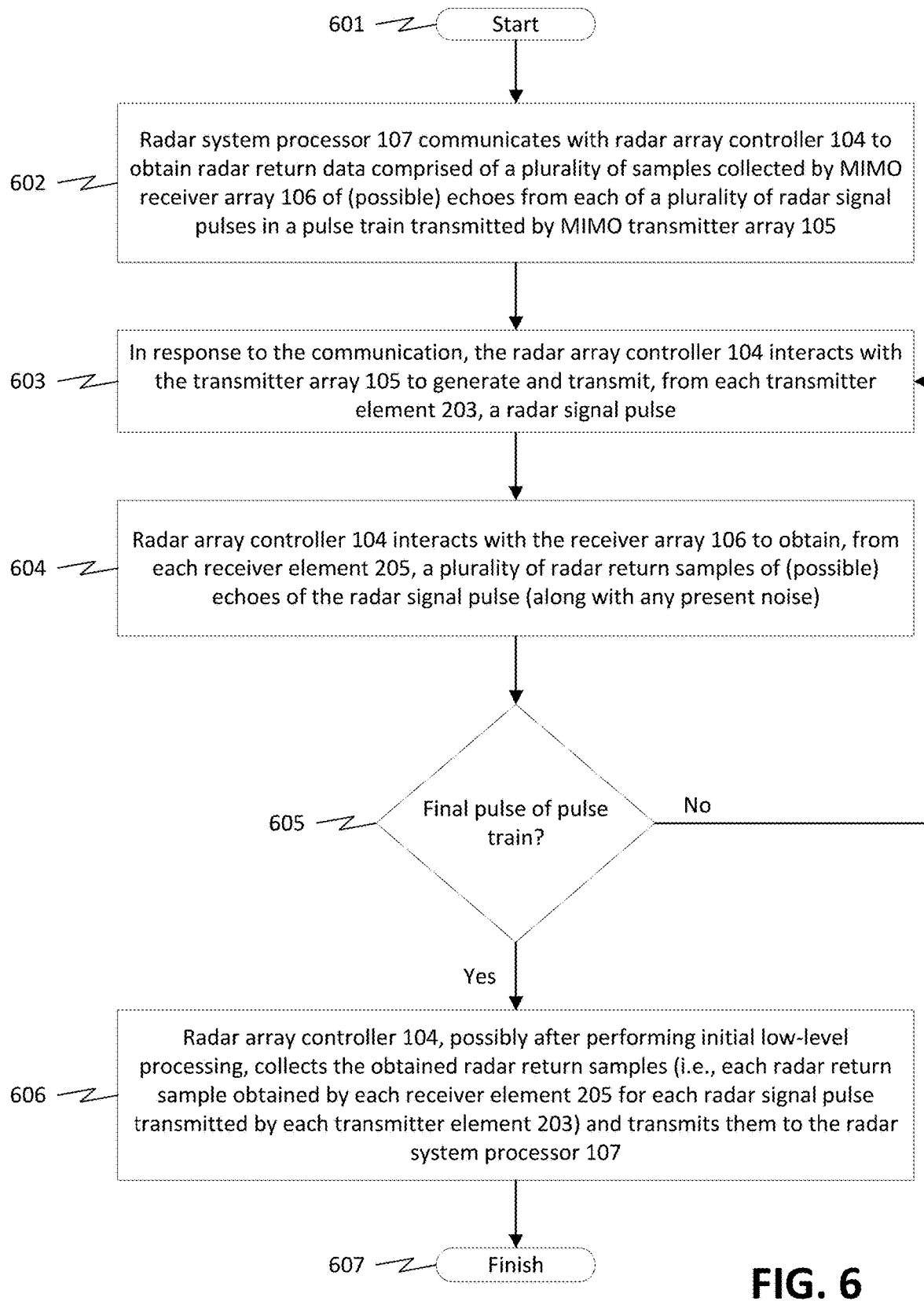
FIG. 6 is a flowchart of an exemplary method of generating a radar signal and measuring its reflection from an object.

FIG. 6 is a flowchart illustrating an exemplary process of generating a radar signal and measuring its reflections, as mentioned above in block 502 of FIG. 5. To start, as shown by block 602 of FIG. 6, the radar system processor 107 communicates with the radar array controller 104 to obtain radar return data. Specifically, the radar return data comprises a plurality of samples collected by MIMO receiver array 106 of (possible) echoes from each of a plurality of radar signals pulses transmitted by MIMO transmitter array 105.

In response to the communication, the radar array controller 104 may interact with the transmitter array 105 to generate and transmit a radar signal pulse. Specifically, as shown by block 603 of FIG. 6, the transmitter array 105 may generate and transmit a radar signal pulse from each transmitter element 203.

After interacting with the transmitter array 105, the radar array controller 104 may interact with the receiver array 106 to receive and record radar return samples. Specifically, as shown by block 604 of FIG. 6, the transmitter array 105 may receive and record samples of (possible) echoes of the transmitted radar signal pulses (along with any present noise) at each receiver element 205.

After recording several radar return samples (by each receiver element 205), as shown by block 605 of FIG. 6, it is determined if the latest radar signal pulse transmitted from the receiver array 106 is the final radar signal pulse in the pulse train. If the radar signal pulse is not the final pulse, the method proceeds to block 603 of FIG. 6. Conversely, if the radar signal pulse is the final pulse, the method proceeds to block 606 of FIG. 6.

More precisely, if the radar signal pulse is determined not to be the final pulse in block 605 of FIG. 6, the next radar signal pulse is transmitted and then listened for. In particular, the method returns to block 603 of FIG. 6 and proceeds with the next signal pulse in the pulse train.

On the other hand, if the radar signal is determined to be the final pulse in block 605 of FIG. 6, the process of collecting and transmitting the recorded radar returns samples is performed. Specifically, as shown in block 606 of FIG. 6, collects all the recorded radar return samples, optionally performs some initial low level processing, and then transmits the collected radar return samples to the radar system processor 107.

Figure 7:
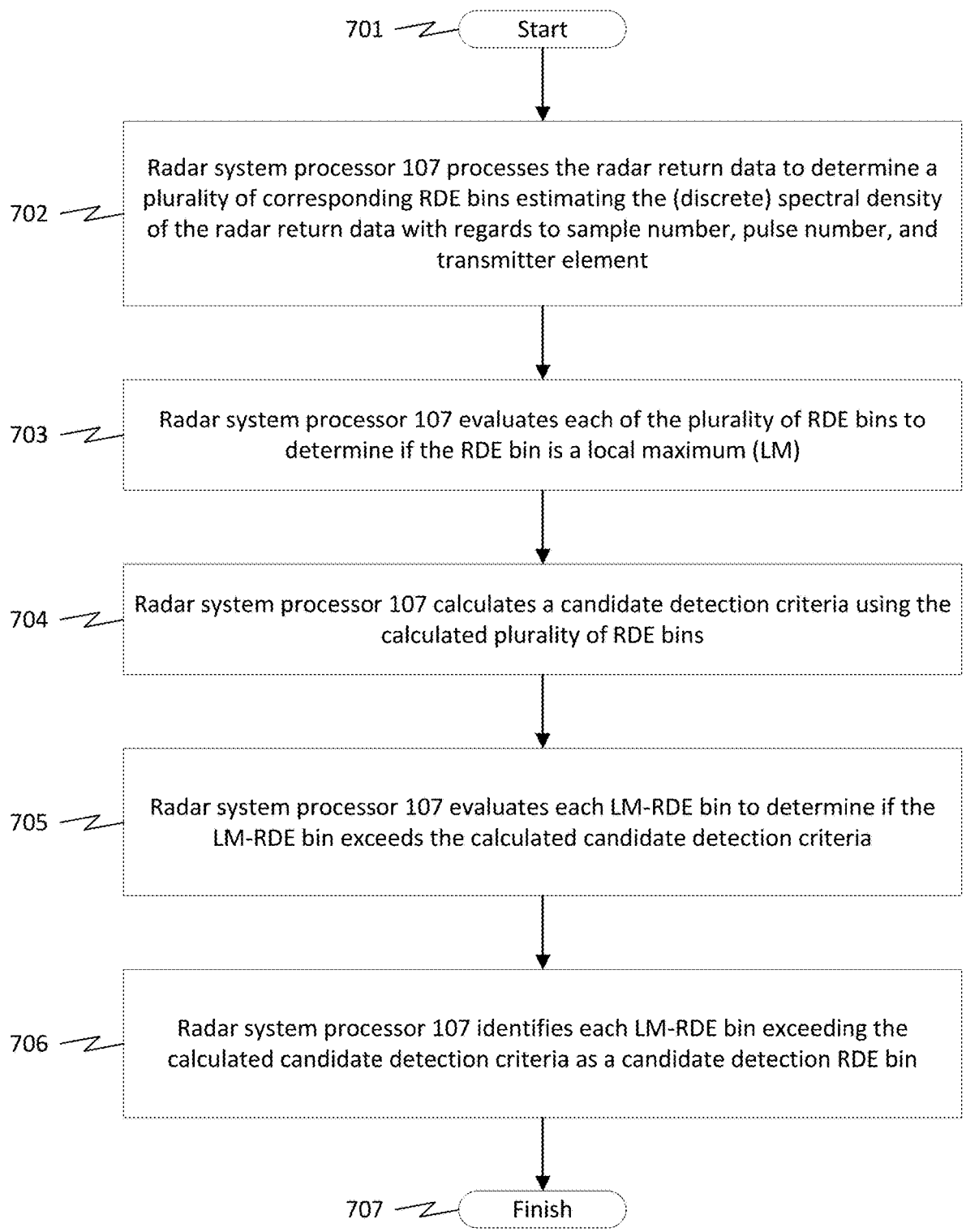
FIG. 7 is a flowchart of an exemplary method of detecting candidate detection range-Doppler-elevation (RDE) bins.

FIG. 7 is a flowchart illustrating an exemplary process of detecting candidate detection RDE bins, as mentioned above in block 503 of FIG. 5. At a high level, this process functions as a first-pass of the radar return data, where the return data is examined using a less complicated (e.g., faster and less resource-intensive) procedure to quickly evaluate what (local maximum) RDE bins (i.e., specific combinations of range, Doppler-velocity, and elevation) have returns with sufficient strength to have even a possibility (given the radar system's performance characteristics) of being found to indicate the presence of an echo of a radar (sub-)signal (and thus being found to indicate a detected scatterer). Towards this end, the first-pass typically has a lower detection threshold than the process described in FIG. 8.

To start, as shown by block 702 of FIG. 7, the radar system processor 107 processes the radar return data to determine a plurality of corresponding RDE bins estimating the (discrete) spectral density of the radar return data with regards to sample number, pulse number, and transmitter element.

Next, as shown in block 703 of FIG. 7, the radar system processor 107 evaluates each of the plurality of RDE bins to determine if the RDE bin is a local maximum (i.e., is an LM-RDE bin).

Next, as shown in block 704 of FIG. 7, the radar system processor 107 calculates a candidate detection criteria using the calculated plurality of RDE bins.

For example, in some embodiments the candidate detection criteria may be based on the median noise power of the estimated spectral density of the radar return data with regards to sample number, pulse number, and transmitter element (i.e., the RDE bins). The noise power can then be multiplied by a noise margin value to give a noise power threshold that controls the degree a signal must exceed the median noise of the calculated spectral density. The candidate detection criteria can then be set as the noise power threshold. In other embodiments, different candidate detection criteria may be used.

Next, as shown in block 705 of FIG. 7, the radar system processor 107 evaluates each LM-RDE bin to determine if the LM-RDE bin exceeds the calculated candidate detection criteria.

Finally, as shown in block 706 of FIG. 7, the radar system processor 107 identifies each LM-RDE bin exceeding the calculated candidate detection criteria as a candidate detection RDE bin.

Figure 8:
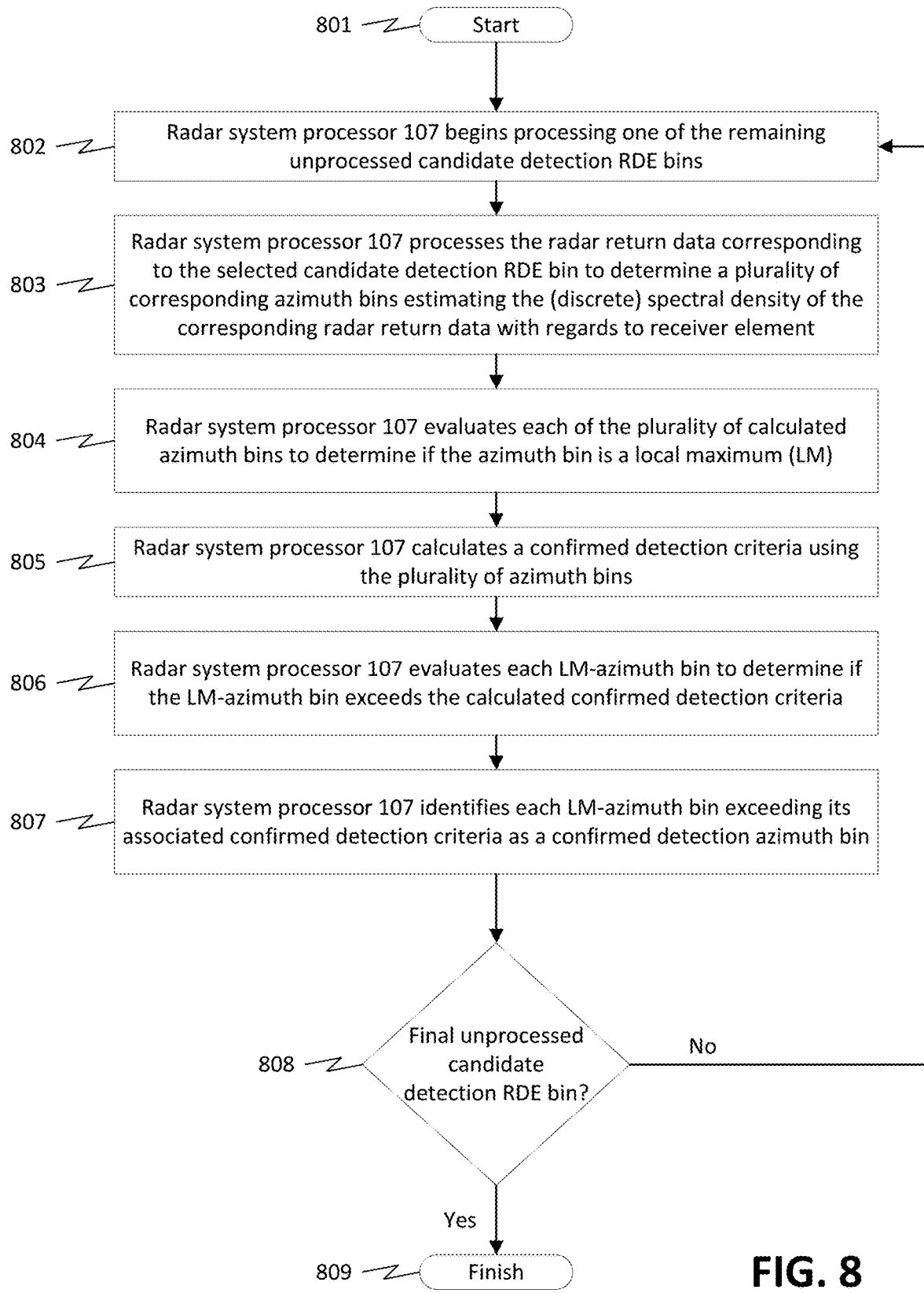
FIG. 8 is a flowchart of an exemplary method of detecting confirmed detection azimuth bins.

FIG. 8 is a flowchart illustrating an exemplary process of detecting confirmed detection azimuth bins, as mentioned above in block 504 of FIG. 5. At a high level, this process functions to confirm or reject the potential detections found in the first-pass. To do so, the return data corresponding to the identified candidate detection RDE bins is examined using a more complicated (e.g., slower and more resource-intensive) procedure to evaluate each azimuth bin associated with a candidate detection RDE bin has a return with sufficient strength relative to the background noise to (with some desired level of accuracy) confirm the presence of an echo of a radar (sub-)signal and thus confirm the presence of a detected scatterer. This typically involves a higher (and more-involved) detection threshold than the process described in FIG. 7, taking into account the spatial asymmetry of environmental noise, unwanted sidelobes, etc.

To start, as shown by block 802 of FIG. 8, the radar system processor 107 begins processing one of the remaining unprocessed candidate detection RDE bins.

Next, as shown by block 803 of FIG. 8, the radar system processor 107 processes the radar return data corresponding to the selected candidate detection RDE bin to determine a plurality of corresponding azimuth bins estimating the (discrete) spectral density of the corresponding radar return data with regards to receiver element.

As an example, one method of calculating the spectral density of the radar return data with respect to receiver element is to generate a receiver phase steering matrix. The receiver phase steering matrix is a two-dimensional matrix where each row represents the value of a receiver frequency component of the radar signal measured by each of the receiver elements 205. The columns of the matrix (called a phase steering vector or a frequency steering vector) represent frequency steering vectors computed at frequency sub-intervals which are determined by dividing the interval between −0.5 and 0.5 into r*i sub-intervals, where r is the number of receiver elements 205 in the MIMO receiver array 106 and i is a sub-division factor. Each column of the matrix represents a frequency steering vector and corresponds to one of these frequency sub-intervals. To populate the matrix, for each row, the value of the radar return samples obtained from the corresponding receiver element 205 is used. Essentially, the matrix is filled out as if all the value of a signal came from any (and all) of the specific frequency steering vectors computed at frequency sub-intervals, with later steps determining which frequency sub-interval (or intervals) contribute to the signal's amplitude.

After generating the receiver phase steering matrix, a target backscatter vector may be generated which indicates which of (and to what extent) the entries in the receiver phase steering matrix is correct (i.e., which phase steering vectors are "correct"). The value of the target backscatter vector may be iteratively calculated from the radar signal samples measured by each of the receiver elements 205 and a noise covariance matrix representing the interference and noise covariance of the radar return samples obtained by the receiver elements 205. In turn, the noise covariance matrix may be calculated from the radar return samples obtained by each of the receiver elements 205 and the current target backscatter vector, with the first iteration using a noise covariance matrix initialized as an identity matrix. Empirically, around 10 to 15 iterations of the process is typically sufficient such that further iterations give little or no increase in accuracy. Once the process is finished, the product of the receiver phase steering matrix and the target backscatter vector represents the spectral density of the signal.

Next, as shown in block 804 of FIG. 8, the radar system processor 107 evaluates each of the calculated plurality of azimuth bins to determine if the azimuth bin is a local maximum (i.e., is an LM-azimuth bin).

Next, as shown in block 805 of FIG. 8, the radar system processor 107 calculates a confirmed detection criteria using the plurality of azimuth bins.

For example, in some embodiments the confirmed detection criteria may be based on the noise power of the estimated spectral density of the radar return data with regards to receiver element (i.e., the azimuth bins) and the global maximum of the spectral density (i.e., the azimuth bin with the greatest intensity). The noise power can then be multiplied by a noise margin value to give a noise power threshold that controls the degree a signal must exceed the local noise. The global maximum can then be multiplied by a power margin value to give a global maximum threshold that controls the degree a signal must be within the global maximum value. The confirmed detection criteria can then be set as the greater of the noise power threshold or the global maximum threshold. To satisfy the confirmed detection criteria, a signal may be required to meet or exceed the set value of the confirmed detection criteria. In other embodiments, different confirmed detection criteria may be used.

Typically, the value of the noise margin value will be greater than one. Conversely, the value of the power margin value will typically be less than one and greater than zero. Empirically, a power margin value that yields a decrease of between 20 decibels (dB) and 30 dB and a noise margin value that yields an increase around 15 dB is well suited for a variety of real-world environments.

Next, as shown in block 806 of FIG. 8, the radar system processor 107 evaluates each LM-azimuth bin to determine if the LM-azimuth bin exceeds the calculated confirmed detection criteria.

Next, as shown in block 807 of FIG. 8, the radar system processor 107 identifies each LM-azimuth bin exceeding the calculated confirmed detection criteria as a confirmed detection azimuth bin.

Finally, as shown in block 808 of FIG. 8, it is determined if the just-processed candidate detection RDE bin is the final unprocessed candidate detection RDE bin. If the just-processed candidate detection RDE bin is not the final unprocessed candidate detection RDE bin, the methods process to block 802 of FIG. 8, where the process repeats for one of the remaining unprocessed candidate detection RDE bins. Conversely, if the just-processed candidate detection RDE bin is the final unprocessed candidate detection RDE bin, the methods process to block 802 of FIG. 8, the method is finished.

Some embodiments of the present disclosure may be employed as part of broader systems that further refine (e.g., through various super-resolution techniques) the azimuth, range, Doppler-velocity, and elevation values for detected scatterers. For example, an exemplary embodiments of such a possible super-resolution radar system is described in commonly-assigned U.S. patent application Ser. No. 17/375,994, entitled "Methods and Systems for Processing Radar Signals" and filed on Jul. 14, 2021, which is herein incorporated by reference in its entirety. The '994 system functions, at a high-level, by using a variant of the MIAA technique to estimate (from received radar return data) missing radar return data when using a sparse MIMO radar array. The '994 system may then process the combined received radar return data and estimated missing radar return data using a variant of a technique known as multi-dimensional folding (MDF)—a super-resolution technique—to detect and estimate the parameters of scatterers (in the area illuminated by the '994 system's sparse MIMO radar array).

The '994 system may be modified to incorporate the process described in FIG. 5, which may enhance the functionality of the '994 system. Specifically, the MIAA step of the '994 system may be replaced with the process described in FIG. 5 (when utilizing the MIAA algorithm to perform step 504). The modified '994 system may then take the estimated scatter parameters and further refine these estimates in its MDF step (i.e., may process the information using a variant of the MDF technique).

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

Now, therefore, the following is claimed:

1. A method for processing radar signals, comprising:
   obtaining radar return data using a pulse multiple-input and multiple-output (MIMO) array, wherein the radar return data comprises a plurality of radar return samples indexed by a sample number, a pulse number, a transmitter number, and a receiver number;
   processing the radar return data to determine a plurality of corresponding range-Doppler-elevation (RDE) bins by estimating a first spectral density computed over the sample number index, the pulse number index, and the transmitter number index;
   evaluating the determined plurality of RDE bins by:
   calculating a candidate detection criteria using the determined plurality of RDE bins;
   evaluating the plurality of RDE bins to determine one or more local maximum RDE bins (LM-RDE) bins; and
   evaluating the one or more LM-RDE bins using the calculated candidate detection criteria to detect one or more candidate detection RDE bins satisfying the calculated candidate detection criteria;
   processing the radar return data corresponding to each of the one or more candidate detection RDE bins to determine for each candidate detection RDE bin a plurality of corresponding azimuth bins by estimating an azimuth spectral density computed over the receiver number index;
   evaluating, for each candidate detection RDE bin of the one or more detected candidate detection RDE bins, the determined plurality of azimuth bins by:
   calculating a confirmed detection criteria using the determined plurality of azimuth bins;
   evaluating the plurality of azimuth bins to determine one or more local maximum azimuth bins (LM-azimuth) bins; and
   evaluating the one or more LM-azimuth bins using the calculated confirmed detection criteria to detect one or more confirmed detection azimuth bins satisfying the calculated confirmed detection criteria; and
   determining locations of one or more scatterers using the confirmed detection azimuth bins.

2. The method of claim 1, wherein estimating the first spectral density computed over the sample number index, the pulse number index, and the transmitter number index comprises calculating a first three-dimensional (3D) frequency transform of the radar return data over the sample number index, the pulse number index, and the transmitter number index.

3. The method of claim 2, wherein calculating the candidate detection criteria using the determined plurality of RDE bins comprises:
   calculating a combined azimuth 3D frequency transform using the first 3D frequency transform by calculating the power sum of each of the determined plurality of RDE bins across the azimuth number index;
   calculating a first median noise power of the plurality of RDE bins using the combined azimuth 3D frequency transform; and
   setting the candidate detection criteria to a first minimum power threshold equal to the first median noise power multiplied by a first noise margin value.

4. The method of claim 3, wherein evaluating the one or more LM-RDE bins using the calculated candidate detection criteria to detect one or more candidate detection RDE bins satisfying the calculated candidate detection criteria comprises comparing each of the one or more LM-RDE bins to the first minimum power threshold to determine if the LM-RDE bin exceeds the first minimum power threshold.

5. The method of claim 2, wherein calculating the 3D frequency transform of the radar return data over the sample number index, the pulse number index, and the transmitter number index comprises calculating a 3D Fourier transform by:
   calculating a first Fourier transform of the radar return data over one of the sample number index, the pulse number index, or the transmitter number index;
   calculating a second Fourier transform of the first Fourier transform of the radar return data over one of the sample number index, the pulse number index, or the transmitter number index not used in calculating the first Fourier transform; and
   calculating a third Fourier transform of the second Fourier transform of the radar return data over one of the sample number index, the pulse number index, or the transmitter number index not used in calculating the first Fourier transform or the second Fourier transform.

6. The method of claim 1, wherein, for each candidate detection RDE bin, estimating the azimuth spectral density computed over the receiver number index comprises calculating a second frequency transform of the radar return data corresponding to the candidate detection RDE bin over the receiver number index.

7. The method of claim 6, wherein, for each candidate detection RDE bin, calculating the confirmed detection criteria comprises:
 calculating a second median noise power of the corresponding plurality of azimuth bins using the second frequency transform;
 calculating a first max power of the corresponding plurality of azimuth bins using the second frequency transform; and
 setting the confirmed detection criteria to the greater of a second minimum power threshold equal to the second median noise power multiplied by a second noise margin value and a first minimum power threshold equal to the first max power multiplied by a first power margin value.

8. The method of claim 7, wherein, for each candidate detection RDE bin, evaluating the one or more LM-azimuth bins using the calculated confirmed detection criteria to detect one or more confirmed detection azimuth bins satisfying the calculated confirmed detection criteria comprises comparing each of the one or more LM-azimuth bins to the second minimum power threshold to determine if the LM-azimuth bin exceeds the second minimum power threshold.

9. The method of claim 6, wherein calculating the second frequency transform of the radar return data corresponding to the candidate detection RDE bin over the receiver number index comprises:
 generating a first phase steering matrix containing phase steering vectors for each of the plurality of azimuth bins corresponding to the candidate detection RDE bin, wherein each of the phase steering vectors corresponds to one of the receiver numbers and has entries for a first plurality of sub-intervals of an interval of frequencies; and
 iteratively calculating a first target backscatter vector using a first noise covariance matrix, the generated first phase steering matrix, and the radar return data corresponding to the candidate detection RDE bin, wherein the first noise covariance matrix represents the interference and noise covariance of the radar return data corresponding to the candidate detection RDE bin and is iteratively calculated using the first target backscatter vector, the generated first phase steering matrix, and the radar return data corresponding to the candidate detection RDE bin.

10. A system for processing radar signals, comprising:
 a pulse multiple-input and multiple-output (MIMO) array comprising:
  a MIMO transmitter array configured to generate and transmit radar signals; and
  a MIMO receiver array configured to obtain radar return data containing possible echoes of the transmitted radar signals, wherein the radar return data comprises a plurality of radar return samples indexed by a sample number, a pulse number, a transmitter number, and a receiver number; and
 at least one processor configured to:
  process the radar return data to determine a plurality of corresponding range-Doppler-elevation (RDE) bins computed over the sample number index, the pulse number index, and the transmitter number index;
  evaluate the plurality of RDE bins to detect one or more candidate detection RDE bins that are local maxima satisfying a calculated candidate detection criteria;
  process the radar return data corresponding to the one or more candidate detection RDE bins to determine for each candidate detection RDE bin a plurality of corresponding azimuth bins computed over the receiver number index;
  evaluate the plurality of azimuth bins of each of the candidate detection RDE bin to detect one or more confirmed detection azimuth bins that are local maxima satisfying a calculated confirmed detection criteria; and
  determine locations of one or more scatterers using the confirmed detection azimuth bins.

11. The system of claim 10, wherein:
processing the radar return data to determine the plurality of corresponding RDE bins comprises estimating a first spectral density computed over the sample number index, the pulse number index, and the transmitter number index; and
evaluating the plurality of RDE bins to detect one or more candidate detection RDE bins further comprises:
 calculating the candidate detection criteria using the determined plurality of RDE bins; and
 evaluating the plurality of RDE bins to determine one or more local maximum RDE bins (LM-RDE) bins; and
 detecting the one or more candidate detection RDE bins by evaluating the one or more LM-RDE bins with the calculated candidate detection criteria.

12. The system of claim 11, wherein:
estimating the first spectral density computed over the sample number index, the pulse number index, and the transmitter number index comprises calculating a first three-dimensional (3D) frequency transform of the radar return data over the sample number index, the pulse number index, and the transmitter number index;
calculating the candidate detection criteria using the determined plurality of RDE bins comprises:
 calculating a combined azimuth 3D frequency transform using the first 3D frequency transform by calculating the power sum of each of the determined plurality of RDE bins across the azimuth number index;
 calculating a first median noise power of the plurality of RDE bins using the combined azimuth 3D frequency transform; and
 setting the candidate detection criteria to a first minimum power threshold equal to the first median noise power multiplied by a first noise margin value; and
detecting the one or more candidate detection RDE bins satisfying the calculated candidate detection criteria comprises comparing the one or more LM-RDE bins to the first minimum power threshold to determine if the LM-RDE bin exceeds the first minimum power threshold.

13. The system of claim 12, wherein calculating the 3D frequency transform of the radar return data over the sample number index, the pulse number index, and the transmitter number index comprises calculating a 3D Fourier transform by:
 calculating a first Fourier transform of the radar return data over one of the sample number index, the pulse number index, or the transmitter number index;
 calculating a second Fourier transform of the first Fourier transform of the radar return data over one of the sample number index, the pulse number index, or the transmitter number index not used in calculating the first Fourier transform; and calculating a third Fourier transform of the second Fourier transform of the radar return data over one of the sample number index, the pulse number index, or the transmitter number index not used in calculating the first Fourier transform or the second Fourier transform.

14. The system of claim 10, wherein:

processing the radar return data of the one or more candidate detection RDE bins to determine for each candidate detection RDE bin the plurality of corresponding azimuth bins comprises estimating an azimuth spectral density computed over the receiver number index; and evaluating the plurality of azimuth bins of each of the candidate detection RDE bin to detect one or more confirmed detection azimuth bins further comprises, for each plurality of azimuth bins of the candidate detection RDE bins:
calculating the confirmed detection criteria using the determined plurality of azimuth bins;
evaluating the plurality of azimuth bins to determine one or more local maximum azimuth bins (LM-azimuth) bins; and
detecting the one or more confirmed azimuth bins by evaluating the one or more LM-azimuth bins with the calculated confirmed detection criteria.

15. The system of claim 14, wherein:

estimating the azimuth spectral density computed over the receiver number index comprises calculating a second frequency transform of the radar return data corresponding to the candidate detection RDE bin over the receiver number index;

calculating the confirmed detection criteria comprises:
calculating a second median noise power of the corresponding plurality of azimuth bins using the second frequency transform;
calculating a first max power of the corresponding plurality of azimuth bins using the second frequency transform; and
setting the confirmed detection criteria to the greater of a second minimum power threshold equal to the second median noise power multiplied by a second noise margin value and a first minimum power threshold equal to the first max power multiplied by a first power margin value; and detecting one or more confirmed detection azimuth bins satisfying the calculated confirmed detection criteria comprises comparing the one or more LM-azimuth bins to the second minimum power threshold to determine if the LM-azimuth bin exceeds the second minimum power threshold.

16. The system of claim 15, wherein calculating the second frequency transform of the radar return data corresponding to the candidate detection RDE bin over the receiver number index comprises:

generating a first phase steering matrix containing phase steering vectors for each of the plurality of azimuth bins corresponding to the candidate detection RDE bin, wherein each of the phase steering vectors corresponds to one of the receiver numbers and has entries for a first plurality of sub-intervals of an interval of frequencies; and iteratively calculating a first target backscatter vector using a first noise covariance matrix, the generated first phase steering matrix, and the radar return data corresponding to the candidate detection RDE bin, wherein the first noise covariance matrix represents the interference and noise covariance of the radar return data corresponding to the candidate detection RDE bin and is iteratively calculated using the first target backscatter vector, the generated first phase steering matrix, and the radar return data corresponding to the candidate detection RDE bin.

17. A non-transitory computer readable medium comprising instructions that, when executed by one or more processors, cause the one or more processors to process radar signals by:

obtaining radar return data using a pulse multiple-input and multiple-output (MIMO) array, wherein the radar return data comprises a plurality of radar return samples indexed by a sample number, a pulse number, a transmitter number, and a receiver number;

processing the radar return data to determine a plurality of corresponding range-Doppler-elevation (RDE) bins computed over the sample number index, the pulse number index, and the transmitter number index;

evaluating the plurality of RDE bins to detect one or more candidate detection RDE bins satisfying a calculated candidate detection criteria;

processing the radar return data corresponding of the one or more candidate detection RDE bins to determine for each candidate detection RDE bin a plurality of corresponding azimuth bins computed over the receiver number index;

evaluating the plurality of azimuth bins of each of the candidate detection RDE bin to detect one or more confirmed detection azimuth bins satisfying a calculated confirmed detection criteria; and determining locations of one or more scatterers using the confirmed detection azimuth bins.

18. The non-transitory computer readable medium of claim 17, wherein:

processing the radar return data to determine the plurality of corresponding RDE bins comprises estimating a first spectral density computed over the sample number index, the pulse number index, and the transmitter number index by calculating a first three-dimensional (3D) frequency transform of the radar return data over the sample number index, the pulse number index, and the transmitter number index; and evaluating the plurality of RDE bins to detect one or more candidate detection RDE bins comprises:
calculating the candidate detection criteria using the determined plurality of RDE bins;
evaluating the plurality of RDE bins to determine one or more local maximum RDE bins (LM-RDE bins); and
detecting the one or more candidate detection RDE bins by evaluating the one or more LM-RDE bins with the calculated candidate detection criteria.

19. The non-transitory computer readable medium of claim 17, wherein:

processing the radar return data of the one or more candidate detection RDE bins to determine for each candidate detection RDE bin the plurality of corresponding azimuth bins comprises estimating an azimuth spectral density computed over the receiver number index by calculating a second frequency transform of the radar return data corresponding to the candidate detection RDE bin over the receiver number index; and evaluating the plurality of azimuth bins of each of the candidate detection RDE bin to detect one or more confirmed detection azimuth bins comprises, for each plurality of azimuth bins of the candidate detection RDE bins:

calculating the confirmed detection criteria using the determined plurality of azimuth bins;

evaluating the plurality of azimuth bins to determine one or more local maximum azimuth bins (LM-azimuth bins); and detecting the one or more confirmed detection azimuth bins by evaluating the one or more LM-azimuth bin with the calculated confirmed detection criteria.

* * * * *